United States Patent [19]
Tsuchiya et al.

[11] 3,947,432
[45] Mar. 30, 1976

[54] PROCESS FOR THE PREPARATION OF NOVEL HIGH CHLORINATED BUTYL RUBBER AND VULCANIZABLE COMPOSITION THEREOF

[75] Inventors: Shozo Tsuchiya, Kawasaki; Yoshikazu Murai, Tamagawa; Saburo Matubara, Yokohama, all of Japan

[73] Assignee: Nippon Oil Company, Tokyo, Japan

[22] Filed: June 10, 1974

[21] Appl. No.: 478,102

Related U.S. Application Data
[63] Continuation of Ser. No. 257,865, May 30, 1972.

[52] U.S. Cl.... 260/79.3 R; 260/33.6 A; 260/85.3 H; 260/94.7 HA; 260/96 HA
[51] Int. Cl................................................. C08d 5/04
[58] Field of Search.. 260/85.3 H, 96 HA, 94.7 HA, 260/33.6 A, 79.3 R

[56] References Cited
UNITED STATES PATENTS
3,779,979    12/1973    Tsuchiya.................... 260/85.3 H X FOREIGN PATENTS OR APPLICATIONS
1,150,815    6/1963    Germany........................... 260/85.3

Primary Examiner—William F. Hamrock
Attorney, Agent, or Firm—Sherman & Shalloway

[57] ABSTRACT

A process for preparation of a highly chlorinated isobutylene-multiolefin copolymer, such as butyl rubber, containing more than one but not exceeding two chlorine atoms per double bond of the copolymer by chlorinating such copolymer in the presence of an aliphatic diamine derivative, such as ethylene diamine, propylene diamine, piperazine, triethylene diamine or bis-N,N-ethylene-ethylene diamine. A vulcanizable composition containing such chlorinated copolymer has improved rate of vulcanization, covulcanizability with highly unsaturated rubber and adhesiveness.

8 Claims, 5 Drawing Figures

PROCESS FOR THE PREPARATION OF NOVEL HIGH CHLORINATED BUTYL RUBBER AND VULCANIZABLE COMPOSITION THEREOF

This is a continuation, of application Ser. No. 257,865, filed May 30, 1972.

This invention relates to a process for preparing novel high chlorinated butyl rubbers which comprises the chlorination of isobutylene-multiolefin copolymers, particularly isobutylene-isoprene copolymers (which are normally collectively referred to as butyl rubber) in the presence of a diamine derivative, and also to the novel vulcanizable compositions containing such high chlorinated butyl rubbers.

More particularly, the invention relates to a process for the preparation of novel chlorinated butyl rubber of high chlorine content (high chlorinated butyl rubber) which comprises the chlorination of a copolymer of isobutylene and minor amount of a multiolefin (butyl rubber) in the presence of a diamine derivative, thereby introducing into the rubber more than one but not exceeding two chlorine atoms per each double bond contained in the copolymer. The invention also relates to high chlorinated butyl rubber-containing vulcanizable compositions having improved adhesiveness and co-vulcanization property, which is composed on a weight basis of 100 parts of the above novel high chlorinated butyl rubber, 1 – 100 parts of a divalent metal oxide, 0 – 150 parts of carbon black, 0 – 5 parts of stearic acid, 0 – 10 parts of sulfur, and 0 – 5 parts of a vulcanization accelerator.

This invention is directed to a process for preparing highly chlorinated butyl rubber of improved adhesiveness and co-vulcanization property as compared with the known low chlorinated butyl rubber containing at most one chlorine atom per each double bond, such as that described in Japanese Official Patent Gazette, Publication No. 13,223/60, as well as to vulcanizable compositions containing such novel high chlorinated butyl rubber; the foregoing improvement being achieved by the chlorination of a hydrocarbon type rubber composed chiefly of isobutylene, in the presence of a minor amount of a diamine derivative, thereby introducing into the rubber more than one but not exceeding two atoms of chlorine per each double bond contained in the starting polymer.

As the hydrocarbon type rubber composed chiefly of isobutylene, butyl rubber has been known for a long time. Butyl rubber is one of the copolymers obtained by copolymerizing, as the monomers, approximately 70 – 99.5 mol percent of isobutylene with approximately 30 – 0.5 mol percent of a multiolefin, and is normally composed of approximately 80 – 99.5 mol percent of isobutylene units and approximately 20 – 0.5 mole percent of isoprene units, more typically of approximately 90 – 99.5 mol percent of isobutylene units and approximately 10 – 0.5 mol percent of isoprene units. The copolymerization is normally performed at low temperatures, in the presence of cationic catalyst. Such a butyl rubber is vulcanizable, and the vulcanized product has high tensile strength, excellent resistance to thermal aging, ozone, and chemicals, high electrical insulation property, and extremely low gas permeability. Because of these favorable properties, the vulcanized product has been used widely as inner tubes of automobile tires, tire curing bags, insulative material for electrical wires and cables, heat-resistant conveyer belts, etc.

On the other hand, butyl rubber is subject to such deficiencies as inferior co-vulcanizability with a highly unsaturated rubber such as natural rubber due to its low degree of unsaturation, and its low adhesiveness. To eliminate these deficiencies, it is known to introduce a minor amount of chlorine into the butyl rubber. This is known as chlorinated butyl rubber and in practice is prepared by the chlorination of the ordinary butyl rubber obtained from isobutylene and a minor amount of isoprene. The product exhibits improved vulcanizability, co-vulcanizability, heat stability and adhesiveness, as compared with butyl rubber and is used as tubeless tires for automobiles, etc., when blended with natural rubber and the like.

However, during the chlorination of butyl rubber, molecular weight reduction takes place concurrently as the foregoing properties are improved by the increased introduction of the chlorine. Particularly when the chlorine content exceeds one atom per each double bond contained in the starting butyl rubber, the molecular weight reduction is aggravated in proportion as the amount of chlorine introduced is increased. Also, side-reactions such as gelation take place. Furthermore, a pronounced discoloration of the product takes place. Thus, there is a limit to the amount of chlorine that can be introduced from a practical standpoint. Accordingly, in spite of the possibility of further improvements in above-noted properties, the introduction of more than one chlorine atom per each double bond contained in the starting butyl rubber has been held to be impracticable.

The object of the present invention is to provide a process for the preparation of high chlorinated butyl rubber which exhibits still more improved vulcanization speed, co-vulcanizability with the high unsaturated rubber, and adhesiveness, imparted by the introduction of chlorine, and also to provide vulcanizable compositions of such a high chlorinated butyl rubber. The objects of the invention are achieved by the use of a novel, high chlorinated butyl rubber of high chlorine content, which was desired but impossible in the past i.e., one in which more than one chlorine atom is contained per each double bond contained in the starting butyl rubber, and furthermore one whose molecular weight is in the high range, showing little molecular weight reduction during the chlorination.

Extensive research has been conducted into such technical problems as the molecular weight reduction which occur during chlorination of butyl rubber, side-reactions such as gelation, increased ratio of chlorine introduction within the practically allowable molecular weight range, and improvement in adhesiveness accompanying the increase in the amount of the chlorine introduced. Prior to the present invention practically no instance was known of success ever having been achieved in attempting to solve the foregoing technical problem by introducing more than one chlorine atom per each double bond while avoiding the objectionable molecular weight reduction during the chlorination of butyl rubber.

It has now been discovered that, by performing the chlorination of butyl rubber in the concurrent presence of a minor amount of a diamine derivative, more than one but not exceeding two atoms per each double bond contained in the starting butyl rubber of chlorine can be introduced without reducing the molecular weight of the rubber, and within such chlorine content range, a high chlorinated butyl rubber having a molecular weight adequate for practical use can be obtained. It has been further discovered that such a high chlorinated butyl rubber exhibits still more improved vulcanization speed, co-vulcanizability with high unsaturated rubber and adhesiveness, as compared with the conventional low chlorinated butyl rubber in which at most one chlorine atom per each double bond contained in the starting butyl rubber is introduced. The present invention was thus perfected.

Accordingly, the invention provides a process for the preparation of novel, high chlorinated butyl rubber in which more than one but not exceeding two chlorine atoms have been incorporated per each double bond contained in the starting butyl rubber, which comprises chlorinating butyl rubber in the presence of a minor amount of a diamine derivative. The invention also provides a novel, vulcanizable composition containing such a high chlorinated butyl rubber, the composition being made up on a weight basis of 100 parts of the high chlorinated butyl rubber, 1 – 100 parts of a divalent metal oxide, 0 – 150 parts of carbon black, 0 – 5 parts of stearic acid, 0 – 10 parts of sulfur, and 0 – 5 parts of a vulcanization accelerator.

It is essential for the high chlorinated butyl rubber of this invention to contain more than one but not more than two chlorine atoms per each double bond contained in the starting butyl rubber. Particularly favorable vulcanization speed, co-vulcanizability with high unsaturated rubbers such as SBR and natural rubber, and adhesiveness are obtained when 1.5 – 1.9 chlorine atoms per each double bond contained in the starting butyl rubber is introduced.

The foregoing summary of the invention and other features and advantages of the invention will be apparent from the following more particular description of the preferred embodiments of the invention, taken together with the following figures in which.

Figure 1:
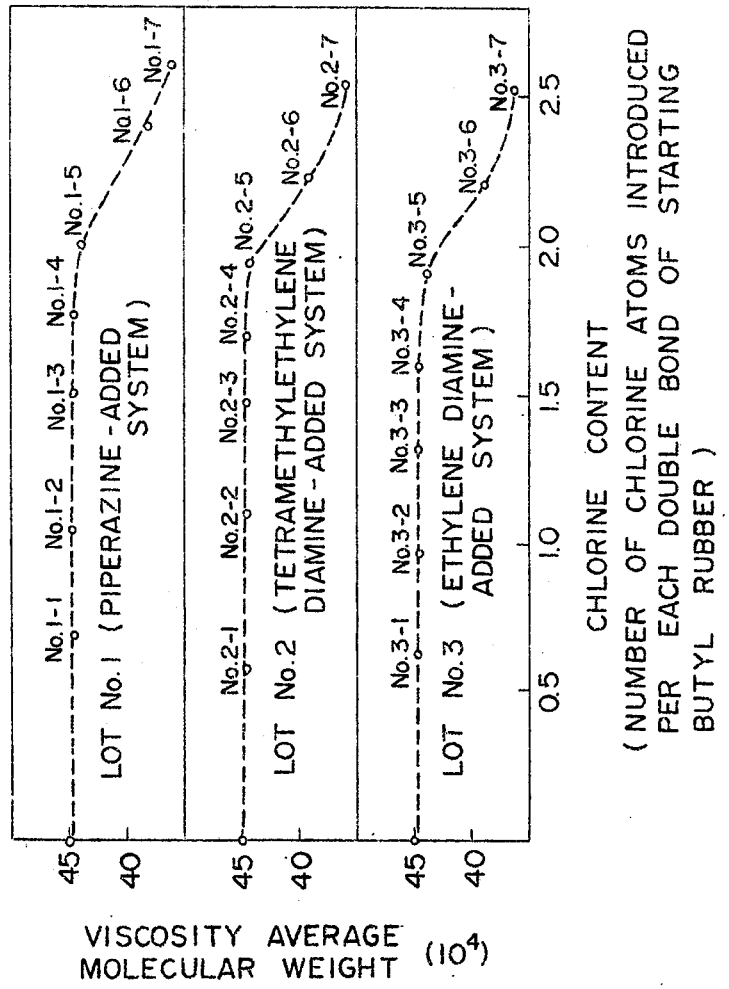
FIG. 1 is a graph illustrating the relationship between the molecular weight and the chlorine content of polymers obtained by carrying out the chlorination reaction by adding either piperazine, tetramethylene diamine or ethylene diamine to an n-hexane solution of butyl rubber.

The starting butyl rubbers employed in the invention are the copolymers composed of approximately 80 – 99.5 mol percent of isobutylene units and approximately 2 – 0.5 mol percent of multiolefin units, and preferably those composed of approximately 90 – 99.5 mol percent of isobutylene units and 10 – 0.5 mol percent of multiolefin units. The term "multiolefin", as used herein, normally includes olefins of 4 – 16 carbon atoms, such as butadiene, cyclopentadiene, piperylene, isoprene, and 1,3-dimethylbutadiene, isoprene being the most preferred.

An effective additive for the preparation of the invention high chlorinated butyl rubber is a compound having the following formula (1):

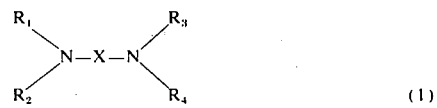

(1)

wherein X is an aliphatic hydrocarbon residue of 2 – 6 carbon atoms, and $R_1$, $R_2$, $R_3$ and $R_4$ are each hydrogen or an alkyl group of 1 – 3 carbon atoms; any of the two of which $R_1$, $R_2$, $R_3$ and $R_4$ taken together may form an aliphatic hydrocarbon residue of 2 – 6 carbon atoms.

The amount of the diamine derivative suitably employed for the preparation of the high chlorinated butyl rubber of this invention ranges on a weight basis from 0.01 – 10 parts, preferably 0.05 – 2 parts, per 100 parts of the starting butyl rubber.

The additive of the foregoing formula (1) used in the invention will be more fully described below. This additive may be any of those having the following formulas (1 - a), (1 - b) and (1 - c):

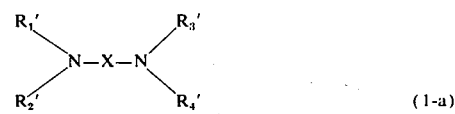

(1-a)

wherein X is an aliphatic hydrocarbon residue of 2 – 6 carbon atoms, and $R_1'$, $R_2'$, $R_3'$ and $R_4'$ are each either hydrogen or a monovalent aliphatic hydrocarbon residue of 1 – 3 carbon atoms, which may be the same or different.

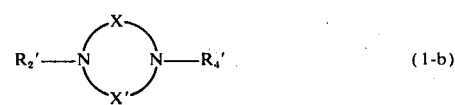

(1-b)

wherein X is as defined above, X' is an aliphatic hydrocarbon residue of 2 – 6 carbon atoms, and $R_2'$ and $R_4'$ are each either hydrogen or a monovalent aliphatic hydrocarbon residue of 1 – 3 carbon atoms, which may be the same or different.

(1-c)

wherein, X, X' and X'' are each an aliphatic hydrocarbon residue of 2 – 6 carbon atoms.

As examples of the additive of the above formula (1 - a), mention can be made of such compounds as ethylene diamine, propylene diamine, hexamethylene diamine, tetramethyl- or tetraethylethylene diamine and tetramethyl- or tetraethylhexamethylene diamine.

Examples of the additives of the aforesaid formula (1-b) include such as piperazine, dimethylpiperazine and diethylpiperazine.

On the other hand, the additives of the foregoing formula (1-c) are exemplified by such as triethylene diamine, tripropylene diamine and trihexamethylene diamine.

Further, the additive of the foregoing formula (1) may also be one having the following formula (1-d):

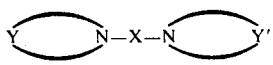 (1-d)

wherein X is as defined in connection with the foregoing formula (1-a), and Y and Y' are each a divalent aliphatic hydrocarbon residue of 2 – 6 carbon atoms. As such an additive, mention can be made of such, for example, as bis-N,N-ethylene ethylene diamine and bis-N,N-ethylene-hexamethylene diamine.

Preferred for use in the present invention are particularly the compounds of the formula (1-a), and those of formula (1-b) wherein the X and X' are the same divalent aliphatic hydrocarbon residue, or the compounds of the formula (1-c) wherein the X, X' and X'' are the same divalent aliphatic hydrocarbon residue.

As the chlorinating agent to be used for the preparation of the invention chlorinated butyl rubber, the usual chlorinating agents will do. For example, conveniently useable are such as gaseous chlorine or sulfuryl chloride.

The chlorination is effectively performed within a period of about one minute to several hours at 0° to 100°C., preferably 20° to 80°C. The temperature and time are controlled so that more than one but not exceeding two chlorine atoms are introduced per double bond of the starting butyl rubber. The amount of chlorine to be introduced is controlled within this range and so as to achieve the desired object of improving the properties, such as adhesiveness, of the rubber. For Example, the amount of chlorine can be controlled at a temperature of 20° to 80°C. with a time of 5 minutes to several hours. When the conditions adopted are such that a low temperature chlorination is to be carried out for a prolonged period of time the adjustment of temperature and time can be accomplished more effectively. If the chlorination temperature is below 0°C., the chlorination speed becomes objectionally low. On the other hand, temperatures higher than 100°C. cause decomposition of the starting butyl rubber, and therefore should be avoided.

The improvement in such properties as adhesiveness of butyl rubber brought about by the introduction of chlorine is still insufficient when the rate of introduction is one or less chlorine atom per double bond contained in the rubber. One the other hand, introduction of two or more chlorine atoms per double bond invites reduction in elasticity of the product rubber. Thus the adjustment of chlorine introduction within the already specified range is critical.

The chlorination in accordance with the invention can be practiced in various manner. One method consists in the addition of chlorine or other chlorination agents, preferably in the form of a solution in alkyl chloride, carbon tetrachloride, etc., to the solution of the starting butyl rubber and a minor amount of diamine derivative in a suitable inert liquid organic solvent, for example, an inert hydrocarbon or a halogenated derivative of a saturated hydrocarbon such as hexane, heptane, naphtha, mineral spirit, benzene, toluene, chlorobenzene, chloroform, trichloroethane, carbon tetrachloride, etc. Another method comprises contacting the gaseous chlorinating agent with a solution of starting butyl rubber and a minor amount of a diamine derivative. Either of the above methods can be satisfactorily practiced at atmospheric pressure, but higher or lower pressures may also be employed. The pressure is suitably varied during the reaction in correlation with the aforesaid chlorination temperature and time, within the range of, for example, 1/10 to 30 atmospheres.

The chlorination with gaseous chlorine is normally performed at around 0° – 80°C., advantageously at approximately 0° – 65°C., and preferably at 20° – 50°C., for approximately 1 minute to several hours. An advantageous pressure range is approximately from 1/20 to 20 atmospheres, atmospheric pressure being quite satisfactory. Specific chlorination conditions are selected to achieve the chlorination of the starting butyl rubber to within the hereinbefore specified range.

The butyl rubber to be chlorinated is advantageously first dissolved in any of the aforesaid solutions, particularly in a saturated hydrocarbon or a completely chlorinated hydrocarbon.

Preferred solvents when the gaseous chlorine is to be used in its dissolved form are carbon tetrachloride, chloroform, cyclohexane, cyclopentane, toluene, and particularly hexane, heptane, benzene, or their mixtures.

The butyl rubber concentration in the solvent will vary depending upon the type of reactor, preparation system, and molecular weight of the rubber, but the invention process can be carried out with a concentration in the range of 1 – 30 wt percent, preferably 5 – 20 wt percent. The chlorination can be effected batchwise or continuously, with stirring. After termination of the chlorination the product can be recovered, refined and dried by any of the various procedures. Conventional operation means and conditions are well applicable to these procedures. The so prepared highly chlorinated butyl rubber normally has a viscosity average molecular weight within the range 300,000 – 800,000, and the degree of unsaturation ranging approximately 0.5 – 10.0, preferably 1.0 – 5.0 mol %. As already mentioned repeatedly, the so obtained rubber contains more than one but not exceeding two chlorine atoms per each double bond contained in the starting butyl rubber.

This high chlorinated butyl rubber can be blended with other known substances as in the case with the conventional low chlorinated butyl rubber to form vulcanizable compositions. That is, this rubber is crosslinkable by the action of sulfur and/or such divalent metal oxide, such as hereinafter given, in the presence or absence of a vulcanization accelerator such as thiuram polysulfides, or other derivatives of thiocarbamic acid. The vulcanization (crosslinking) can be performed, using such vulcanizing agents and/or vulcanization accelerators as, for example, (1) zinc oxide, (2) zinc oxide and sulfur, (3) zinc oxide and tetramethylthiuram disulfide, (4) sulfur and zinc dialkylpolythiocarbamate, (5) tetramethylthiuram disulfide, (6) tellurium diethyldithiocarbamate and (7) lead oxide and p-quinonedioxane and/or sulfur.

It is advantageous to form the vulcanizable compositions by blending the vulcanizing agent, accelerator, and filler, etc., at the following quantitative ratios, per 100 parts by weight of the high chlorinated butyl rubber of the present invention.

| Ingredient | Usable Range (parts by weight) | Preferred Range (parts by weight) |
|---|---|---|
| Carbon black | 0 – 150 | 27 – 75 |

| Ingredient | Usable Range (parts by weight) | Preferred Range (parts by weight) |
|---|---|---|
| Zinc oxide | 1 – 100 | 2 – 30 |
| Parting agent (e.g., stearic acid) | 0 – 5 | 0 – 2 |
| Sulfur | 0 – 10 | 0 – 5 |
| Accelerator (e.g., tetramethylthiuram disulfide) | 0 – 5 | 0 – 2 |
| Antioxidant (e.g., N-lauryl p-aminophenol) | 0 – 5 | 0 – 2 |

In using the invention vulcanizable composition the vulcanizing operation when the invention high chlorinated butyl rubber is used alone or the co-vulcanization of it when blended with other rubbery materials can be performed at approximately 95° – 230°C., and preferably 120° – 180°C., in approximately several seconds to several tens of hours. Normally, the vulcanization or co-vulcanization is practiced, for example, at 95°C., for approximately 10 minutes to 20 hours, or at 200°C., for 1/2 to 20 minutes. Specific vulcanization conditions can be suitably selected according to the intended utility of the vulcanization product, and properties and quantities of the high chlorinated butyl rubber of this invention and of the rubber additives to be vulcanized therewith. Generally speaking, the optimum results are obtained by carrying out the vulcanization at approximately 120° – 200°C. for about 30 minutes to 5 hours. It is also permissible to blend the conventionally employed process oil with the compositions of this invention.

The novel high chlorinated butyl rubber compositions of the invention as above-described are vulcanizable by a still wider varieties of shaping processes and vulcanizing procedures, according to the end desired. The invention compositions allow the preparation of valuable rubber products of remarkably improved properties such as adhesiveness with the operation being carried out more advantageously economically as well as with greater commercial ease than the case of a similar vulcanizable composition using the conventional low clorinated butyl rubber.

The following examples are given for illustrating more specifically the unique features of the present invention. In the examples the parts are on a weight basis, unless otherwise specified.

EXAMPLE I

Figure 2:
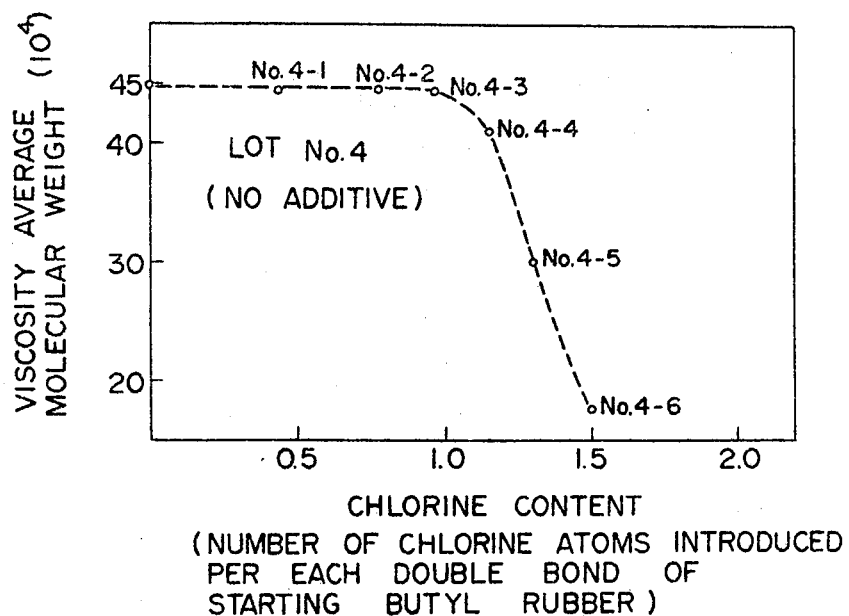
FIG. 2 is a graph showing the relationship between the molecular weight and the chlorine content of polymers obtained by carrying out the chlorination reaction of butyl rubber in an n-hexane solution.

95 Parts of isobutylene and 5 parts of isoprene were dissolved in methyl chloride. To this solution 0.2 parts of aluminum secondary butoxide and 0.5 part of boron trifluoride were added per 100 parts of the monomer, after which the polymerization was carried out at −100°C. Next, the solvent was stripped and the reaction product was water-washed, and the catalyst was decomposed to obtain butyl rubber (A) having a degree of unsaturation of 1.47 mol percent and a viscosity average molecular weight of 450,000. Four lots (Nos. 1, 2, 3 and 4) of 10 percent n-hexane solutions of this butyl rubber were then prepared. To solutions 1, 2 and 3 1.0 part of anhydrous piperazine, tetramethylene diamine and ethylene diamine was added, respectively, based on the butyl rubber. On the other hand, for purpose of comparison, no additive was added to solution No. 4 Chlorine gas was then blown into these solutions while holding their temperature at 50°C. During the progress of the reaction, a small quantity of the polymeric solution was withdrawn and, after thorough washing, was dropped into methanol, from which the polymer was separated by filtration and dried under reduced pressure. This operation was repeated with solution Nos. 1, 2, 3 and 4. The relationship between the molecular weight and the chlorine content of the resulting polymers was individually measured with the results shown in FIGS. 1 and 2. As is apparent from FIGS. 1 and 2, in the case of the systems including piperazine (No. 1), tetramethyleneethylene diamine (No. 2) and ethylene diamine (No. 3) there is practically no decline in the molecular weight of the polymer even though 2 atoms of chlorine are introduced per each double bond of the starting rubber (See FIG. 1). On the other hand, in the case of the system which does not have an additive incorporated therein (No. 4), the molecular weight of the polymer declines abruptly when the chlorine content exceeds one atom per each double bond of the starting butyl rubber to form a low molecular weight material which is of no practical use as rubber (See FIG. 2). Thus, it is seen that in the case of the conventional method in which the chlorination is carried out by passing chlorine gas through a butyl rubber solution the molecular weight of the polymer demonstrates an abrupt drop when the chlorine introduced into the polymer exceeds one atom per each double bond of the starting butyl rubber to render the polymer of no practical use as rubber, but in the case where the chlorination is carried out by adding a small amount of a specific diamine derivative to the butyl rubber solution in accordance with the present invention practically no decline in the molecular weight of the polymer takes place even though up to two atoms of chlorine are introduced per each double bond contained in the starting butyl rubber.

EXAMPLE II

For the purpose of comparing the chlorinated butyl rubber of low chlorine content obtained by the conventional method with the high chlorine-containing chlorinated butyl rubber obtained in accordance with the invention process, the high chlorine-containing chlorinated rubber No. 1-3 (containing 1.50 chlorine atoms per double bond), No. 2-4 (containing 1.70 chlorine atoms per double bond) and No. 3-4 (containing 1.60 chlorine atoms per double bond), obtained in Example I in accordance with the invention process, and as controls a low chlorinated butyl rubber No. 4-3 (containing 0.96 chlorine atom per double bond) and No. 4-6 (containing 1.50 chlorine atoms per double bond), obtained by the conventional method were each compounded in the vulcanization system shown in Table 1 and vulcanized for 30 minutes at 150°C. A tensile test of the so obtained products was conducted with the results shown in Table 2.

Table 1

| Ingredient | Parts |
|---|---|
| Rubber | 100 |
| HAF black | 50 |
| Zinc flower | 5 |
| Sulfur | 2 |
| Mercaptobenzothiazole | 1.5 |
| Tetramethylthiuram disulfide | 0.15 |
| Stearic acid | 1 |
| N-phenyl β-naphthylamine | 1 |

Table 2

| Experiment | Sample No. | Chlorine Content (Cl/F)* | Molecular Weight ($10^4$) | Tensile strength (Kg/cm²) | Modulus at 300 % (Kg/cm²) | Elongation (%) |
|---|---|---|---|---|---|---|
| Control | 4-3 | 0.96 | 44 | 190 | 110 | 550 |
| do. | 4-6 | 1.50 | 18 | — | not vulcanizable | — |
| Invention example | 1-3 | 1.50 | 44 | 200 | 170 | 350 |
| do. | 2-4 | 1.70 | 44 | 195 | 180 | 350 |
| do. | 3-4 | 1.60 | 44 | 210 | 190 | 400 |

*Cl/F denotes the number of chlorine atoms introduced per each double bond of the starting butyl rubber.

It is apparent from the foregoing Table 2 that the high chlorinated butyl rubber in accordance with the invention (Nos. 1-3, 2-4 and 3-4) has much greater modulus than that of the conventional chlorinated butyl rubber (No. 4-3). Further, in the case of the chlorinated polymer No. 4-6 in which a large amount of chlorine was introduced by means of the conventional chlorination method the molecular weight was extremely low, and since it was not vulcanizable, it could not be used as rubber.

It is thus seen that the process of the present invention makes it possible to synthesize a high chlorinated butyl rubber containing above one chlorine atom per each double bond of the starting butyl rubber and that this rubber is superior in its vulcanizability to the conventional low chlorinated butyl rubber containing less than one chlorine atom per each double bond of the starting butyl rubber.

EXAMPLE III

The high chlorinated butyl rubber No. 1-3 (containing 1.50 atoms of chlorine per each double bond of the starting butyl rubber and of a viscosity average molecular weight of $44\times10^4$) obtained by the synthesis in Example I by its chlorination with the piperazine-incorporated system was compounded as shown in the following Table 3 and then vulcanized for 40 minutes at 150°C., followed by conducting a tensile test of the resulting product. As a control, the conventional low chlorinated butyl rubber No. 4-3 (containing 0.96 atom of chlorine per each double bond of the starting butyl rubber and of a viscosity average molecular weight of $44\times10^4$) synthesized in Example I was also compounded, vulcanized and tested. The results obtained are shown in Table 4.

Table 3

| Ingredient | Composition 1 (Invention example) | Composition 2 (Control) | Composition 3 (invention example) | Composition 4 (Control) |
|---|---|---|---|---|
| Chlorinated rubber No. 1-3 | 100 parts | — | 100 parts | — |
| Chlorinated rubber No. 4-3 | — | 100 parts | — | 100 parts |
| HAF black | 50 parts | 50 parts | 50 parts | 50 parts |
| Zinc flower | 5 parts | 5 parts | 5 parts | 5 parts |
| Tetramethylthiuram disulfide | 1 part | 1 part | — | — |
| Mercaptobenzothiazole | 1 part | 1 part | — | — |
| Stearic acid | 1 part | 1 part | 1 part | 1 part |

Table 4

| Composition | Tensile strength (Kg/cm²) | Modulus at 300% (Kg/cm²) | Elongation (%) |
|---|---|---|---|
| 1 | 195 | 160 | 400 |
| 2 | 180 | 100 | 500 |
| 3 | 130 | 90 | 500 |
| 4 | 130 | 70 | 500 |

The foregoing results demonstrate that the invention high chlorinated butyl rubber can be vulcanized with a vulcanization system which does not use sulfur, and especially that it can be vulcanized by the use of zinc flower alone. Further, it is apparent from the foregoing Table 4 that the invention high chlorinated butyl rubber gives vulcanized products having a modulus greater than that of the conventional low chlorinated butyl rubber regardless of the vulcanization system used.

EXAMPLE IV

The high chlorinated butyl rubber No. 1-3 obtained in Example I was compounded as shown in the following Table 5 with SBR and co-vulcanized therewith. As a control, a similar co-vulcanization operation was carried out using the conventional low chlorinated butyl rubber No. 4-3. After a vulcanization for 30 minutes at 150°C., a tensile test was conducted with the results shown in Table 6.

Table 5

| | Composition (Invention example) | Composition 6 (Control) | Composition 7 (Invention example) | Composition 8 (Control) |
|---|---|---|---|---|
| Chlorinated rubber No. 1-3 | 75 | — | 50 | — |
| Chlorinated rubber No. 4-3 | — | 75 | — | 50 |

Table 5-continued

| | Composition 5 (Invention example) | Composition 6 (Control) | Composition 7 (Invention example) | Composition 8 (Control) |
| --- | --- | --- | --- | --- |
| SBR - 1500 | 25 | 25 | 50 | 50 |
| Zinc flower | 5 | 5 | 5 | 5 |
| Sulfur | 2 | 2 | 2 | 2 |
| Mercaptobenzothiazole | 1.5 | 1.5 | 1.5 | 1.5 |
| Tetrathiuram disulfide | 0.15 | 0.15 | 0.15 | 0.15 |
| Stearic acid | 1 | 1 | 1 | 1 |
| N-phenyl-$\beta$-naphthylamine | 1 | 1 | 1 | 1 |
| HAF black | 50 | 50 | 50 | 50 |

Table 6

| Composition | Tensile strength (Kg/cm$^2$) | Modulus at 300% (Kg/cm$^2$) | Elongation (%) |
| --- | --- | --- | --- |
| 5 | 150 | 120 | 350 |
| 6 | 130 | 90 | 300 |
| 7 | 180 | 160 | 350 |
| 8 | 170 | 120 | 300 |

As is apparent from the results given in the foregoing Table 6, it is seen that in the case of the co-vulcanized product of the invention high chlorinated butyl rubber No. 1-3, the modulus and tensile strength are much greater than those of the case of the conventional low chlorinated butyl rubber No. 4-3.

Figure 3:
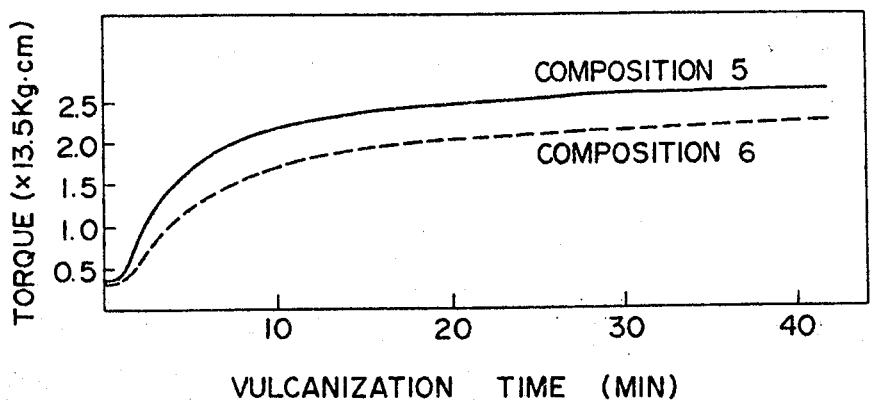
FIGS. 3 and 4 are graphs illustrating the results obtained by measurement of the behaviors of the co-vulcanization of chlorinated butyl rubber and SBR with a curelastometer.
Figure 4:
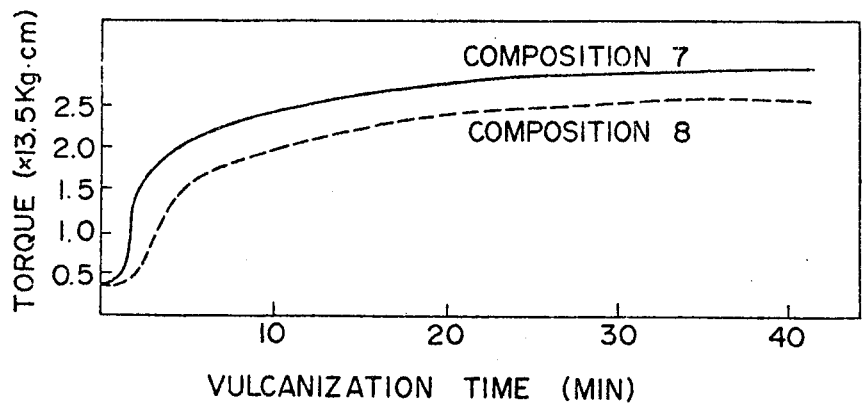

Further, the composition shown in Table 5 were measured for their vulcanization speed at 150°C., using a cureleastometer (manufactured by Nippon Synthetic Rubber Co.). The results obtained are shown in FIGS. 3 and 4. It is apparent from FIGS. 3 and 4 that the vulcanization speed of the compositions 5 and 7, which used the invention high chlorinated butyl rubber No. 1-3, is much faster than that of the compositions 6 and 8, which used the conventional low chlorinated butyl rubber.

Thus, this example shows that a marked improvement occurs in the co-vulcanizability of the invention high chlorinated butyl rubber when used with SBR, as compared with that of the conventional low chlorinated butyl rubber.

EXAMPLE V

A methyl chloride solution of 0.2 part of aluminum chloride in 100 parts of the monomer was added to a solution in methyl chloride of 93 parts of isobutylene and 7 parts of isoprene, following which the polymerization reaction was carried out at −100°C. The reaction product was then stripped of the solvent and the catalyst was decomposed by water-washing to obtain a rubbery copolymer (butyl rubber [B]). This copolymer was then dissolved in carbon tetrachloride to obtain a 15 percent by weight solution, after which 0.5 percent by weight of ethylene diamine was added thereto in accordance with the invention. While holding this solution at 40°C., chlorine gas was blown in to synthesize the chlorinated rubber No. 5-1 shown in the following Table 7. As a control, a rubber obtained by carrying out the conventional chlorination method without adding ethylene diamine is shown in the following Table 7 as chlorinated rubber No. 5-2.

The chlorinated rubbers Nos. 5-1 and 5-2 were used, and after being compounded with Alfin rubber (Alfin 1530, produced by Japan Alfin Rubber Co.) as in the following Table 8, were co-vulcanized therewith.

The compositions shown in Table 8 were vulcanized for 30 minutes at 150°C. with the results shown in Table 9.

From the results given in Table 9, it is apparent that the tensile strength and modulus are much greater when the invention high chlorinated butyl rubber No. 5-1 has been co-vulcanized with Alfin rubber, as compared with the case where the conventional low chlorinated butyl rubber No. 5-2 has been co-vulcanized.

Figure 5:
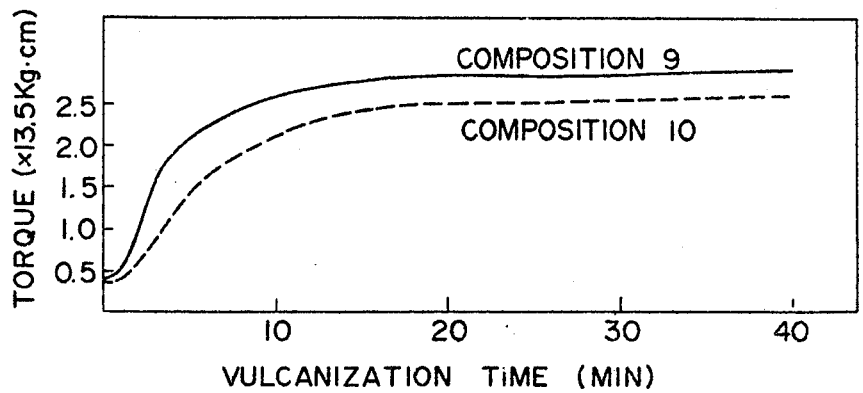
FIG. 5 is a graph showing the results obtained by measurement of the behaviors of the co-vulcanization of chlorinated butyl rubber and Alfin rubber with a curelastometer.

Further, the vulcanization speed of the compositions 9 and 10 at 150°C. was measured with a curelastometer. The results are shown in FIG. 5. It is apparent from FIG. 5 that the vulcanization speed of composition 9, which used the invention high chlorinated butyl rubber No. 5-1, was exceedingly great as compared with that of composition 10, which used the conventional low chlorinated butyl rubber No. 5-2.

Thus, this example shows that in its co-vulcanization with Alfin rubber the invention high chlorinated butyl rubber demonstrates a marked improvement in its co-vulcanizability, as compared with the case of the conventional low chlorinated butyl rubber.

Table 7

| Experiment | Rubber used | Number of chlorine atoms per double bond | Viscosity average molecular weight ($\times 10^4$) |
| --- | --- | --- | --- |
| Invention example | Chlorinated rubber No. 5-1 | 1.59 | 39 |
| Control | do. No. 5-2 | 0.93 | 39 |

Table 8

| Ingredient | Composition 9 (invention example) | Composition 10 (control) |
| --- | --- | --- |
| Chlorinated rubber No. 5-1 | 50 parts | — |
| Chlorinated rubber No. 5-2 | — | 50 parts |
| Alfin 1530 | 50 | 50 |
| Zinc flower | 5 | 5 |
| Sulfur | 2 | 2 |
| Tellurium diethyl dithiocarbamate | 1 | 1 |
| Stearic acid | 1 | 1 |
| N-phenyl-$\beta$-naphthylamine | 1 | 1 |
| HAF black | 50 | 50 |

Table 9

| Composition | Tensile strength (Kg/cm$^2$) | Modulus at 300% (Kg/cm$^2$) | Elongation (%) |
| --- | --- | --- | --- |
| 9 | 160 | 140 | 350 |

Table 9-continued

| Composition | Tensile strength (Kg/cm²) | Modulus at 300% (Kg/cm²) | Elongation (%) |
| --- | --- | --- | --- |
| 10 | 140 | 110 | 350 |

EXAMPLE VI

The high chlorinated butyl rubbers Nos. 1-4, 1-6, 2-4, 2-5, 2-6, 3-5 and 3-6 obtained in Example I were compounded as in the following Table 10 and then vulcanized for 25 minutes at 160°C. with the results shown in Table 11.

The results of Table 11 show that in the case of the chlorinated butyl rubbers Nos. 1-6, 2-6, and 3-6 where the chlorine introduced into the polymer exceeded 2 atoms per each double bond of the starting butyl rubber there was in all instances a slight decline in the molecular weight as well as a marked decline in the physical properties of the vulcanized product, thus indicating that the introduction of chlorine in excess of 2 atoms per each double bond of the starting butyl rubber was undesirable from the standpoint of achieving the object of the invention, i.e., the obtainment of chlorinated butyl rubber having good vulcanizability.

Table 10

| Ingredient | Parts |
| --- | --- |
| Rubber | 100 |
| HAF black | 50 |
| Zinc flower | 5 |
| Sulfur | 2 |
| Mercaptobenzothiazole | 1 |
| Tetramethylthiuram disulfide | 0.5 |
| Stearic acid | 1 |
| N-phenyl-β-naphtylamine | 1 |

Table 11

| | | Polymer used in composition | | | Results of the terminal test of the vulcanized product | | |
| --- | --- | --- | --- | --- | --- | --- | --- |
| | | Chlorine content (Cl/F)* | Molecular weight (×10⁴) | Additive for chlorination reaction | Tensile strength (Kg/cm²) | Modulus at 300 % (Kg/cm²) | Elongation (%) |
| Invention example | No. 1-4 | 1.77 | 44 | Piperazine-added system | 200 | 170 | 350 |
| Control | No. 1-6 | 2.40 | 38 | | 120 | — | 200 |
| Invention example | No. 2-4 | 1.70 | 44 | Tetramethylethylene diamine-added system | 210 | 180 | 400 |
| Invention example | No. 2-5 | 1.94 | 44 | | 200 | 180 | 400 |
| Control | No. 2-6 | 2.23 | 39 | | 140 | — | 175 |
| Invention example | No. 3-5 | 1.91 | 43 | Ethylene diamine-added system | 195 | 170 | 450 |
| Control | No. 3-6 | 2.21 | 38 | | 120 | — | 200 |

*Cl/F denotes the number of chlorine atoms introduced per each double bond of the starting butyl rubber.

EXAMPLE VII

The high chlorinated butyl rubber No. 5-1 according to the present invention and the conventional low chlorinated butyl rubber No. 5-2 synthesized in Example V, and SBR - 1500 and natural rubber RSS - 1 were compounded as in Table 12.

Sheets 1 mm in thickness were prepared from each of the compositions shown in Table 12. Next, compositions 11 and 13 and compositions 12 and 13 were adhered, following which the two assemblies were vulcanized for 40 minutes at 150°C. The strength of adhesion of the adhered surfaces of the vulcanized products was then measured in accordance with JIS-K-6301 with the results shown in Table 13. The results of the foregoing Table 13 show that the adhesiveness to such polyunsaturated rubbers as blends of SBR and natural rubber is much better in the case of the invention high chlorinated butyl rubber No. 5-1 than the conventional low butyl rubber No. 5-2.

Table 12

| Ingredient | Composition 11 | Composition 12 | Composition 13 |
| --- | --- | --- | --- |
| Chlorinated rubber No. 5-1 | 100 | — | — |
| Chlorinated rubber No. 5-2 | — | 100 | — |
| SBR-15000 | — | — | 50 |
| RSS-1 | — | — | 50 |
| Zinc flower | 5 | 5 | 5 |
| Sulfur | 2 | 2 | 2 |
| Tellurium diethyl-dithiocarbamate | 1 | 1 | 1 |
| Stearic acid | 1 | 1 | 1 |
| N-phenyl-β-naphthylamine | 1 | 1 | 1 |
| HAF black | 50 | 50 | 50 |

Table 13

| Experiment | Combination | Strength of adhesion (Kg/cm) |
| --- | --- | --- |
| Invention example | Compositions 11 and 13 | 1.54 |
| Control | Compositions 12 and 13 | 1.04 |

EXAMPLE VIII

Using the butyl rubber [A], the chlorination reaction was carried out under varied conditions as shown in the following Table 14.

Next, the several rubbers of the Table 14 (Nos. 6-1 - 6-6) were compounded in accordance with the compounding system in Table 10 and then vulcanized for 40 minutes at 150°C. The results obtained are shown in Table 15.

The results of Tables 14 and 15 show that the process of the present invention makes it possible to introduce more than one chlorine atom per double bond under various reaction conditions without causing a decline in the molecular weight of the polymer and, in addition, that chlorinated rubber having good physical properties such as satisfactory tensile strength and modulus can be obtained regardless of the conditions under which the polymer is synthesized.

As controls also shown in Tables 14 and 15 are instances where amine compounds not used in the invention as additives have been incorporated (Nos. 6-7 to 6-10).

The results obtained in the case of these controls clearly indicate that good results are not demonstrated by the use of the amine compounds that are not the diamine derivatives specified by the present invention.

Table 14

| Chlorinated rubber | | Additive used in the chlorination reaction | | Class of chlorinating agent | Solvent | Polymer concentration (wt %) | Temperature | Resulting polymer | |
|---|---|---|---|---|---|---|---|---|---|
| | | Class | Amount (wt %) | | | | | Chlorine content | Molecular weight (× 10⁴) |
| Invention example | No. 6-1 | tetraethylethylene diamine | 1.0 | Cl₂ gas | n-hexane | 10 | 40°C. | 1.50 | 43 |
| | No. 6-2 | do. | 0.5 | SO₂Cl₂ | benzene | 5 | 30°C. | 1.30 | 44 |
| | No. 6-3 | ethylene diamine | 1.5 | SO₂Cl₂ | carbon tetrachloride | 20 | 60°C. | 1.70 | 42 |
| | No. 6-4 | hexamethylene diamine | 0.7 | Cl₂ gas | chloroform | 15 | 50°C. | 1.85 | 42 |
| | No. 6-5 | piperazine | 1.5 | SO₂Cl₂ | isooctane | 20 | 70°C. | 1.63 | 41 |
| | No. 6-6 | triethylene diamine | 3.0 | Cl₂ gas | carbon tetrachloride | 20 | 50°C. | 1.55 | 44 |
| Control | No. 6-7 | triethylamine | 0.5 | SO₂Cl₂ | n-hexane | 15 | 50°C. | 1.54 | 19 |
| | No. 6-8 | diphenylamine | 0.5 | Cl₂ gas | carbon tetrachloride | 15 | 50°C. | 1.58 | 13 |
| | No. 6-9 | diethylamine | 1.0 | Cl₂ gas | carbon tetrachloride | 10 | 55°C. | 1.61 | 16 |
| | No. 6-10 | n-hexylamine | 1.5 | SO₂Cl₂ | isooctane | 20 | 50°C. | 1.52 | 20 |

Cl/F denotes the number of chlorine atoms introduced per each double bond of the starting butyl rubber.

Table 15

| | Chlorinated rubber | Tensile strength (Kg/cm²) | Modulus at 300 % (Kg/cm²) | Elongation |
|---|---|---|---|---|
| Invention example | No. 6-1 | 210 | 180 | 350 |
| | No. 6-2 | 190 | 160 | 450 |
| | No. 6-3 | 200 | 170 | 350 |
| | No. 6-4 | 195 | 180 | 350 |
| | No. 6-5 | 205 | 175 | 400 |
| | No. 6-6 | 190 | 180 | 350 |
| Control | No. 6-7 | | unvulcanizable | |
| | No. 6-8 | | unvulcanizable | |
| | No. 6-9 | | unvulcanizable | |
| | No. 6-10 | 100 | — | 150 |

What is claimed is:

1. A process for the preparation of a chlorinated isobutylene-multiolefin copolymer having a multiolefin unit containing 4 to 6 carbon atoms, which comprises contacting a chlorinating agent with a solution of an isobutylene-multiolefin copolymer composed of 80 to 99.5 mol percent of isobutylene units and 20 to 0.5 mol percent of the multiolefin units in an inert organic solvent at a temperature of 0° to 100°C. and in the presence of 0.01 to 10 parts by weight per 100 parts by weight of the copolymer of an aliphatic diamine derivative of the formula

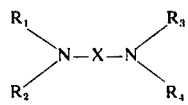

wherein X is an aliphatic hydrocarbon residue of 2 – 6 carbon atoms, and $R_1$, $R_2$, $R_3$ and $R_4$ are each a member selected from the group of hydrogen and an alkyl group of 1 – 3 carbon atoms, any two of which $R_1$, $R_2$, $R_3$ and $R_4$ taken together may form an aliphatic hydrocarbon residue of 2 – 6 carbon atoms, said chlorination reaction being carried out to such an extent that from 1.5 to 1.9 chlorine atoms per double bond contained in the copolymer are introduced into the copolymer.

2. The process of claim 1, wherein said copolymer comprises 90 to 99.5 mol percent of isobutylene units and 10 to 0.5 mol percent of isoprene units.

3. The process of claim 1, wherein the amount of said aliphatic diamine derivative is 0.05 to 2 parts by weight per 100 parts by weight of said copolymer.

4. The process of claim 1, wherein said diamine derivative is expressed by the following formula (1-a)

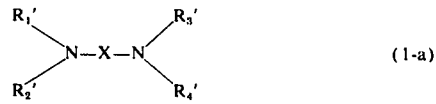
(1-a)

wherein X is an aliphatic hydrocarbon residue having 2 to 6 carbon atoms, each of $R_1'$, $R_2'$, $R_3'$ and $R_4'$ is a hydrogen atom or a monovalent aliphatic hydrocarbon residue of 1 to 3 carbon atoms, and these groups may be the same or different.

5. The process one of claim 1 wherein said diamine derivative is expressed by the following formula (1-b)

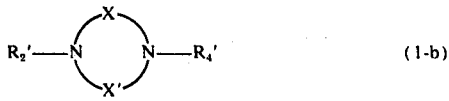
(1-b)

wherein X and X' each represent an aliphatic hydrocarbon residue of 2 to 6 carbon atoms and may be the same or different, and $R_2'$ and $R_4'$ each represent a hydrogen atom or a monovalent hydrocarbon residue of 1 to 3 carbon atoms and may be the same or different.

6. The process one of claim 1 wherein said diamine derivative is expressed by the following formula (1-c)

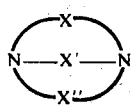

(1-c)

wherein each of X, X' and X'' is a divalent aliphatic hydrocarbon residue having 2 to 6 carbon atoms and these groups may be the same or different.

7. The process of claim 1, wherein said organic solvent is selected from the group consisting of inert hydrocarbons and inert halogenated hydrocarbons.

8. The process of claim 1 wherein the chlorination is carried out at 20° to 80°C.

* * * * *

UNITED STATES PATENT AND TRADEMARK OFFICE
CERTIFICATE OF CORRECTION

PATENT NO. : 3,947,432
DATED : March 30, 1976
INVENTOR(S) : Shozo Tsuchiya et al.

It is certified that error appears in the above-identified patent and that said Letters Patent are hereby corrected as shown below:

Insert the following Foreign Application Priority Data:

-- June 1, 1971    Japan ................... 46-37436/71 --

Claim 5, line 1, delete "one"

Claim 6, line 1, delete "one"

Signed and Sealed this

Seventeenth Day of August 1976

[SEAL]

Attest:

RUTH C. MASON
Attesting Officer

C. MARSHALL DANN
Commissioner of Patents and Trademarks